US010768610B2

(12) United States Patent
Unagami et al.

(10) Patent No.: US 10,768,610 B2
(45) Date of Patent: Sep. 8, 2020

(54) INFORMATION PROCESSING APPARATUS, INFORMATION PROCESSING METHOD, AND RECORDING MEDIUM HAVING PROGRAM RECORDED THEREIN

(71) Applicant: Panasonic Intellectual Property Corporation of America, Torrance, CA (US)

(72) Inventors: Yuji Unagami, Osaka (JP); Takuji Hiramoto, Osaka (JP); Tatsumi Oba, Osaka (JP); Tomohiro Oda, Osaka (JP); Naoki Ochi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 87 days.

(21) Appl. No.: 16/168,686

(22) Filed: Oct. 23, 2018

(65) Prior Publication Data

US 2019/0155258 A1 May 23, 2019

(30) Foreign Application Priority Data

Nov. 17, 2017 (JP) ................................ 2017-222257

(51) Int. Cl.
| | |
|---|---|
| *G05B 19/41* | (2006.01) |
| *G06F 9/54* | (2006.01) |
| *G06F 11/14* | (2006.01) |
| *G05B 19/418* | (2006.01) |
| *G06F 11/34* | (2006.01) |
| *G05B 15/02* | (2006.01) |
| *G05B 9/02* | (2006.01) |
| *G06Q 10/06* | (2012.01) |

(52) U.S. Cl.
CPC .......... *G05B 19/4184* (2013.01); *G06F 9/542* (2013.01); *G06F 11/14* (2013.01); *G06F 11/3476* (2013.01); *G05B 2219/32222* (2013.01)

(58) Field of Classification Search
CPC .................. G05B 15/02; G05B 19/058; G05B 2219/24196; G05B 23/0272; G05B 23/0289; G05B 9/02; G05B 9/03; G05B 19/4184; G05B 2219/32222; G06Q 10/06; G06Q 10/103; G06Q 10/08; G06F 9/542; G06F 11/14; G06F 11/3476
USPC ............................................ 700/45, 90, 108
See application file for complete search history.

(56) References Cited

U.S. PATENT DOCUMENTS

2017/0171188 A1* 6/2017 Saito .................... H04L 63/083

FOREIGN PATENT DOCUMENTS

JP 2016-143320 8/2016

* cited by examiner

*Primary Examiner* — Michael J Brown
(74) *Attorney, Agent, or Firm* — Greenblum & Bernstein, P.L.C.

(57) ABSTRACT

An integration server manages production in a manufacturing line that includes a first stage and a second stage carried out after the first stage. The integration server includes a communicator that acquires a first production log and a second production log. The first production log includes a first production count of processing objects in the first stage. The second production log includes the number of processing objects in the second stage. The integration server also includes an irregularity detector that detects the presence of irregularity in the first production log and the second production log on the basis of the first production count and the number of the processing objects in the second stage.

5 Claims, 12 Drawing Sheets

FIG. 4A

| PRODUCT ITEM NUMBER | MANUFACTURING APPARATUS | PLANNED PRODUCTION COUNT | PANNED PRODUCTION TIME |
|---|---|---|---|
| AAAA | MANUFACTURING APPARATUS 120 | 1000 | 10:00 TO 12:00 |
| AAAA | MANUFACTURING APPARATUS 220 | 995 | 11:30 TO 12:30 |
| ⋮ | ⋮ | ⋮ | ⋮ |

FIG. 4B (a)

| PRODUCT ITEM NUMBER | MANUFACTURING APPARATUS | DELIVERY COUNT | GOOD PRODUCT COUNT | DEFECTIVE PRODUCT COUNT | PRODUCTION TIME |
|---|---|---|---|---|---|
| AAAA | MANUFACTURING APPARATUS 120 | 1000 | 990 | 10 | 10:00 TO 12:00 |

(b)

| PRODUCT ITEM NUMBER | MANUFACTURING APPARATUS | DELIVERY COUNT | GOOD PRODUCT COUNT | DEFECTIVE PRODUCT COUNT | PRODUCTION TIME |
|---|---|---|---|---|---|
| AAAA | MANUFACTURING APPARATUS 220 | 990 | 985 | 5 | 12:00 TO 13:00 |

INFORMATION PROCESSING APPARATUS, INFORMATION PROCESSING METHOD, AND RECORDING MEDIUM HAVING PROGRAM RECORDED THEREIN

BACKGROUND

1. Technical Field

The present disclosure relates to an information processing apparatus, an information processing method, and a recording medium having a program recorded therein that detect the presence of irregularity in a manufacturing line.

2. Description of the Related Art

In recent years, various devices, such as network devices, experience an unauthorized access in some instances. As such, logs output from various devices are analyzed to detect any unauthorized access. For example, Japanese Unexamined Patent Application Publication No. 2016-143320 discloses a log monitoring method that enables an early discovery of any suspicious target to be monitored from a large quantity of logs.

SUMMARY

In one general aspect, the techniques disclosed here feature an information processing apparatus that manages production in a manufacturing line. The information processing apparatus includes a communicator that acquires a first production log and a second production log. The first production log includes a first production count of processing objects in a first stage included in the manufacturing line. The second production log includes the number of processing objects in a second stage included in the manufacturing line and carried out after the first stage. The information processing apparatus also includes an irregularity detector that detects the presence of irregularity in the first production log and the second production log on the basis of the first production count and the number of the processing objects in the second stage.

The present disclosure can provide an information processing apparatus, an information processing method, and a recording medium having a program recorded therein that can detect the presence of irregularity in a production log without stopping the operation of the manufacturing line.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4A illustrates an example of a production plan according to the first embodiment;

FIG. 4B illustrates an example of a production log according to the first embodiment;

DETAILED DESCRIPTION

Figure 1:
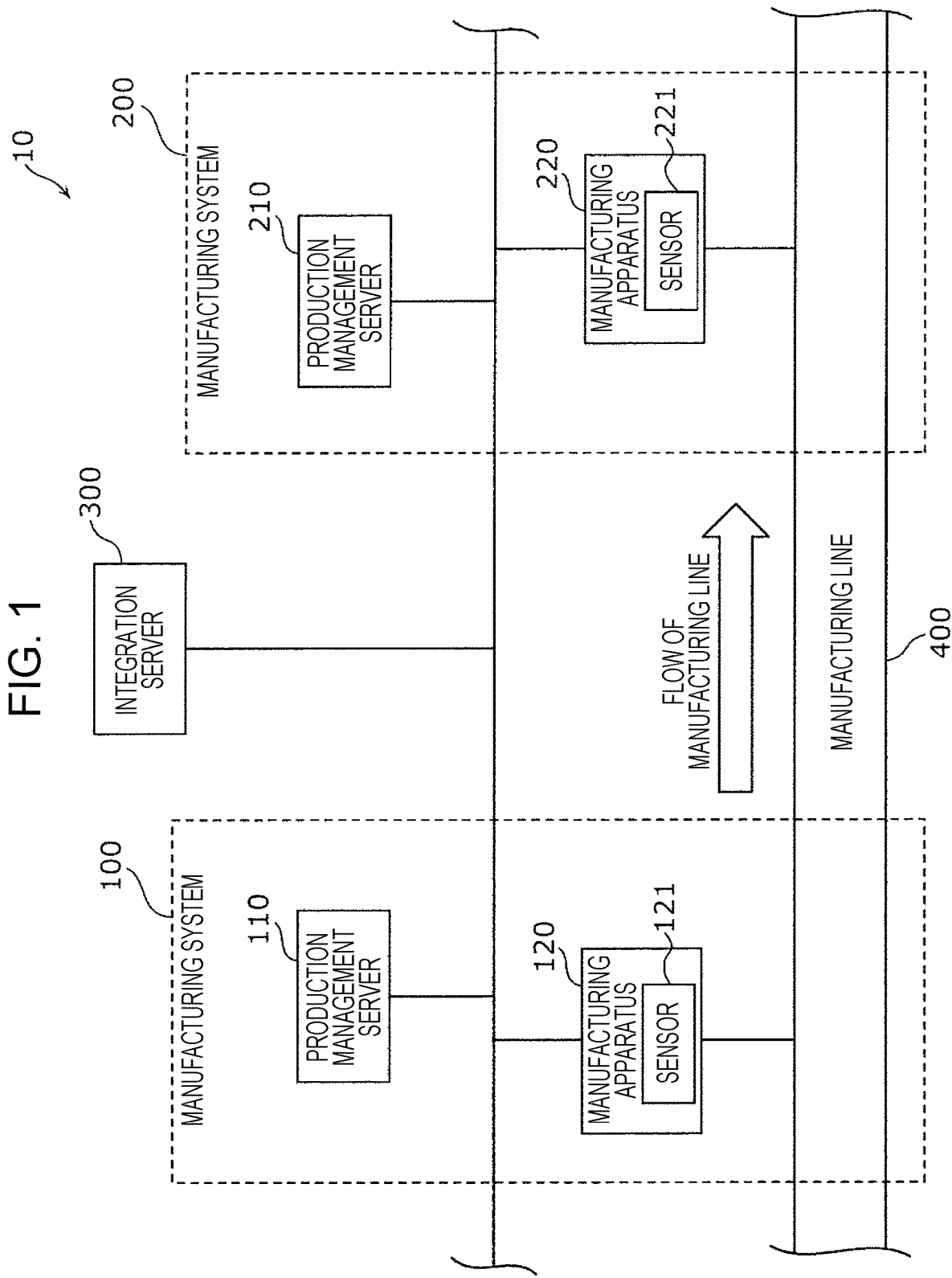
FIG. 1 illustrates a configuration of an irregularity detecting system according to a first embodiment.

In a manufacturing line, there is a possibility that a production management server or the like that manages the production of a manufacturing apparatus is infected with a virus or the like and a production log including a production history is altered. Meanwhile, stopping the operation of the manufacturing line exerts a large influence on the production plan, and thus it is desirable not to stop the operation.

The present disclosure provides an information processing apparatus, an information processing method, and a recording medium having a program recorded therein that can detect the presence of irregularity in a production log without stopping the operation of the manufacturing line.

Hereinafter, an information processing apparatus, an information processing method, and a program according to the present disclosure will be described in detail with reference to the drawings. It is to be noted that the embodiments described hereinafter merely illustrate specific, preferable examples of the present disclosure. Therefore, the numerical values, the shapes, the materials, the constituent elements, the arrangement and the connection modes of the constituent elements, the steps, the order of the steps, and so on illustrated in the following embodiments are examples and are not intended to limit the present disclosure. Accordingly, among the constituent elements in the following embodiments, any constituent element that is not described in an independent claim expressing the broadest concept of the present disclosure will be described as an optional constituent element.

It is to be noted that the appended drawings and the following descriptions are provided to help a person skilled in the art to understand the present disclosure at a sufficient level, and these drawings and descriptions are not intended to limit the subject matter set forth in the claims.

In addition, the drawings are schematic diagrams and do not necessarily provide the exact depictions. In the drawings, substantially identical configurations are given identical reference characters, and duplicate descriptions thereof may be omitted or simplified.

First Embodiment

An irregularity detecting system 10 that includes an integration server 300 according to the present embodiment will be described with reference to FIG. 1 to FIG. 9.

1. Configuration of Irregularity Detecting System

First, the irregularity detecting system 10 according to the present embodiment will be described with reference to FIG. 1 to FIG. 4B.

FIG. 1 illustrates a configuration of the irregularity detecting system 10 according to the present embodiment.

As illustrated in FIG. 1, the irregularity detecting system 10 includes a manufacturing system 100, a manufacturing system 200, and the integration server 300. The manufacturing systems 100 and 200 each carry out a predetermined process on a processing object being conveyed in a manufacturing line 400. In the present embodiment, the manufacturing systems 100 and 200 each carry out the predetermined process on a processing object being conveyed in the manufacturing line 400 in accordance with a production plan created by the integration server 300. The irregularity detecting system 10 may include another manufacturing system aside from the manufacturing systems 100 and 200. In addition, as illustrated in FIG. 1, the manufacturing systems 100 and 200 are in-lined. A processing object corresponds to an intermediate product that has not yet been made into a finished product (product). A finished product is fabricated from a processing object through at least the manufacturing systems 100 and 200.

The manufacturing system 100 is constituted by a production management server 110 and a manufacturing apparatus 120.

The production management server 110 is a server apparatus that is communicably connected to the integration server 300 and the manufacturing apparatus 120 and that manages the production of the manufacturing apparatus 120 in accordance with a production plan created by the integration server 300. The production management server 110 issues a production instruction to the manufacturing apparatus 120 in accordance with the production plan acquired from the integration server 300. In addition, the production management server 110 acquires a production count and so on from the manufacturing apparatus 120 and outputs a production log including the acquired production count to the integration server 300.

Now, a functional configuration of the production management server 110 will be described with reference to FIG. 2.

Figure 2:
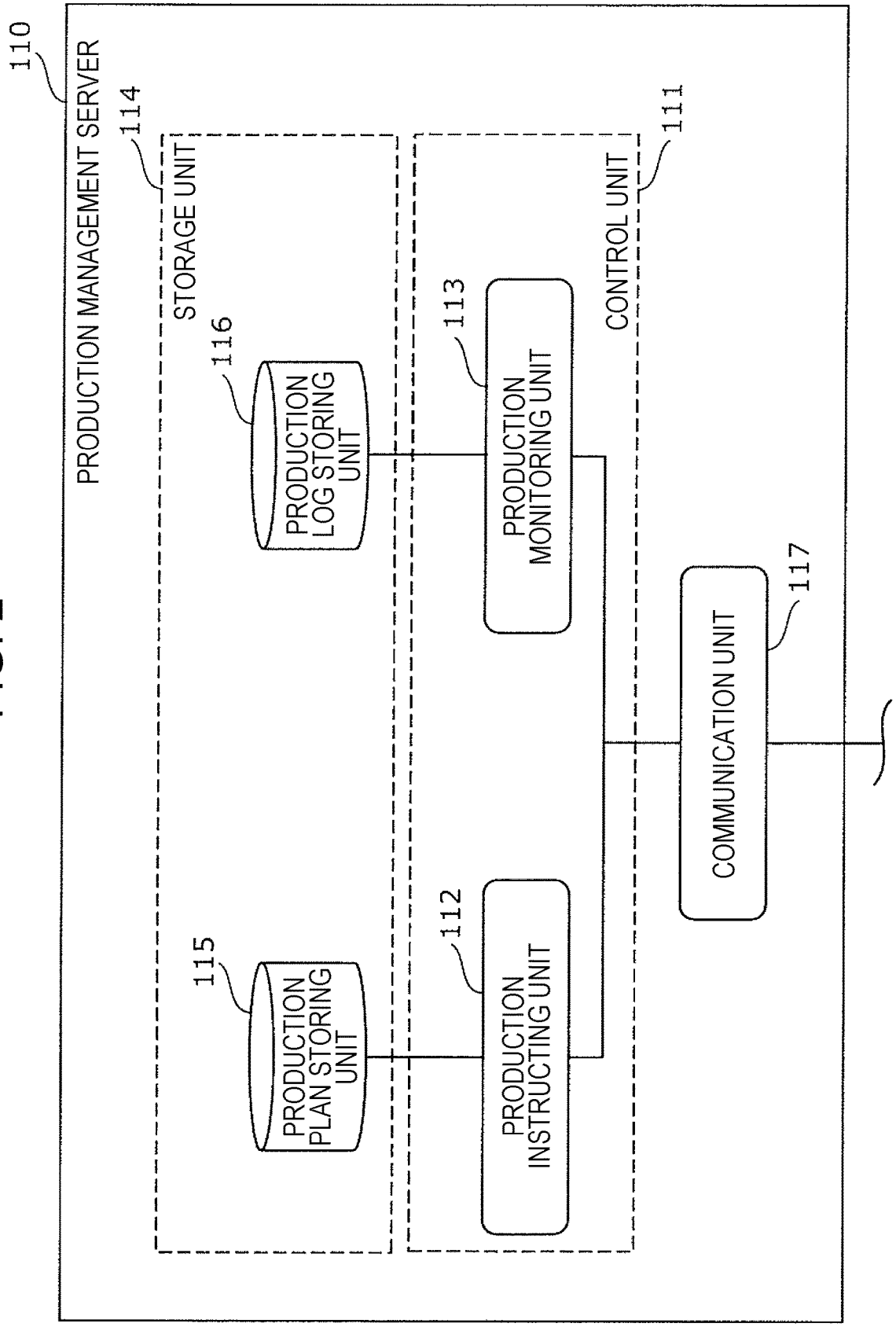
FIG. 2 is a block diagram illustrating a functional configuration of a production management server according to the first embodiment.

FIG. 2 is a block diagram illustrating a functional configuration of the production management server 110 according to the present embodiment.

As illustrated in FIG. 2, the production management server 110 includes a control unit 111, a storage unit (memory) 114, and a communication unit 117.

The control unit 111 includes a production instructing unit 112 and a production monitoring unit 113. The production management server 110 is implemented, for example, by a general-purpose processor and a memory (e.g., the storage unit 114). In this case, upon a software program that is stored in the memory having been executed by the processor, the processor functions as the control unit 111 (specifically, as the production instructing unit 112 and the production monitoring unit 113). Alternatively, the production management server 110 may be implemented in the form of one or more dedicated electronic circuits corresponding to the production instructing unit 112 and the production monitoring unit 113.

The production instructing unit 112 acquires a production plan from the integration server 300 via the communication unit 117 and stores the acquired production plan into a production plan storing unit 115. In addition, the production instructing unit 112 outputs a production instruction that is based on the production plan to the manufacturing apparatus 120 via the communication unit 117. The production instruction includes, for example, the time at which the production is to be started and a planned production count.

The production monitoring unit 113 acquires a production log from the manufacturing apparatus 120 via the communication unit 117 and stores the acquired production log into a production log storing unit 116. In addition, the production monitoring unit 113 outputs the production log to the integration server 300 via the communication unit 117. The production monitoring unit 113 may acquire a production log at a predetermined time interval or acquire production logs successively from the manufacturing apparatus 120. The duration of the predetermined time interval may be, for example, a duration required to process processing objects of a planned production count (e.g., a production count for one Lot) that is based on the production plan.

The storage unit 114 includes the production plan storing unit 115 that stores a production plan and the production log storing unit 116 that stores a production log. The storage unit 114 may also store information aside from the production plan and the production log. For example, the storage unit 114 may store the aforementioned software program.

The communication unit 117 is a communication circuit for communicating with the integration server 300 and the manufacturing apparatus 120. For example, the production instructing unit 112 acquires a production plan from the integration server 300 and outputs a production instruction that is based on the production plan to the manufacturing apparatus 120 via the communication unit 117. In addition, for example, the production monitoring unit 113 acquires a production log from the manufacturing apparatus 120 and outputs the acquired production log to the integration server 300 via the communication unit 117.

It is to be noted that the method of communication between the integration server 300 and the production management server 110 and the method of communication between the production management server 110 and the manufacturing apparatus 120 are not particularly limited, and wired communication or wireless communication may be employed.

Referring again to FIG. 1, the manufacturing apparatus 120 carries out a predetermined process on a processing object having been conveyed through the manufacturing line 400. The predetermined process may be a process carried out to fabricate a product (finished product) having a predetermined function or shape. The predetermined process may be, for example, a certain kind of processing, assembling, inspection, retaining, or the like or may be any other process. The processing object subjected to the predetermined process in the manufacturing apparatus 120 is conveyed to the manufacturing system 200 through the manufacturing line 400. The number of the processing objects that have been processed by the manufacturing apparatus 120 is an example of a first production count. Although detailed descriptions will be given later, the first production count may be the number of good products among the processing objects that have been processed by the manufacturing apparatus 120.

As described above, as the manufacturing apparatus 120 carries out the predetermined process on a processing object under the management of the production management server 110, a first stage is achieved. In other words, the first stage is achieved by the manufacturing system 100.

In the present embodiment, the manufacturing apparatus 120 includes a sensor 121. The sensor 121 detects the number of the processing objects that have been conveyed from a preceding stage. In other words, the sensor 121 detects the number of the processing objects delivered into the manufacturing apparatus 120. The sensor 121 may be an infrared sensor, an image sensor, or any other sensor. The number of the processing objects detected by the sensor 121 is an example of a delivery count in the manufacturing apparatus 120.

The manufacturing apparatus 120 outputs, to the production management server 110, a production log that includes, for example, the delivery count in the first stage and the first production count. The production log output by the manufacturing apparatus 120 to the production management server 110 is an example of a first production log.

It is not a limiting example that the manufacturing apparatus 120 includes the sensor 121, and it suffices that the manufacturing system 100 include the sensor 121. For example, the manufacturing apparatus 120 and the sensor 121 may each be a separate component. As long as the sensor 121 can detect the number of the processing objects delivered into the manufacturing apparatus 120, the mode of the sensor 121 is not particularly limited.

In addition, the manufacturing system 100 may further include a determination unit that determines the quality of a processing object that has been processed by the manufacturing apparatus 120. The determination unit may be provided integrally with the manufacturing apparatus 120, for example. The determination unit may determine the quality, for example, by analyzing an image captured by an image sensor, determine the quality on the basis of a predetermined physical property value of a processing object, or determine the quality through any other method.

The manufacturing system 200 is constituted by a production management server 210 and a manufacturing apparatus 220. The manufacturing apparatus 220 processes a processing object that has been processed by the manufacturing apparatus 120. The production management server 210 and the manufacturing apparatus 220 have configurations similar to those of the production management server 110 and the manufacturing apparatus 120, respectively, and descriptions thereof will be omitted. The process carried out by the manufacturing apparatus 220 may differ from the process carried out by the manufacturing apparatus 120, for example. The number of the processing objects detected by a sensor 221 is an example of a delivery count in the manufacturing apparatus 220, and the number of the processing objects that have been processed by the manufacturing apparatus 220 is an example of a second production count. Although detailed descriptions will be given later, the second production count may be the number of the good products among the processing objects that have been processed by the manufacturing apparatus 220.

In addition, as the manufacturing apparatus 220 carries out the predetermined process on a processing object under the management of the production management server 210, a second stage is achieved. In other words, the second stage is achieved by the manufacturing system 200. The second stage is a stage downstream from the first stage in the manufacturing line 400. In other words, the second stage is carried out after the first stage. In the present embodiment, the second stage is carried out continuously after the first stage. It is not a limiting example that the first stage and the second stage are continuous, and a third stage in which a process different from those in the first stage and the second stage may be provided between the first stage and the second stage. In addition, as illustrated in FIG. 1, the first stage and the second stage are in-lined.

The manufacturing apparatus 220 outputs, to the production management server 210, a production log that includes the delivery count in the second stage and the second production count. Then, the production management server 210 outputs the production log acquired from the manufacturing apparatus 220 to the integration server 300. The production log output by the manufacturing apparatus 220 to the production management server 210 is an example of a second production log.

The integration server 300 is a server apparatus that manages the production in the manufacturing line 400 including the first stage and the second stage, which is carried out after the first stage. The integration server 300 is communicably connected to the production management servers 110 and 210. The integration server 300 may be disposed in a plant where the first stage and the second stage are carried out or at a location different from such a plant.

Now, a functional configuration of the integration server 300 will be described with reference to FIG. 3.

Figure 3:
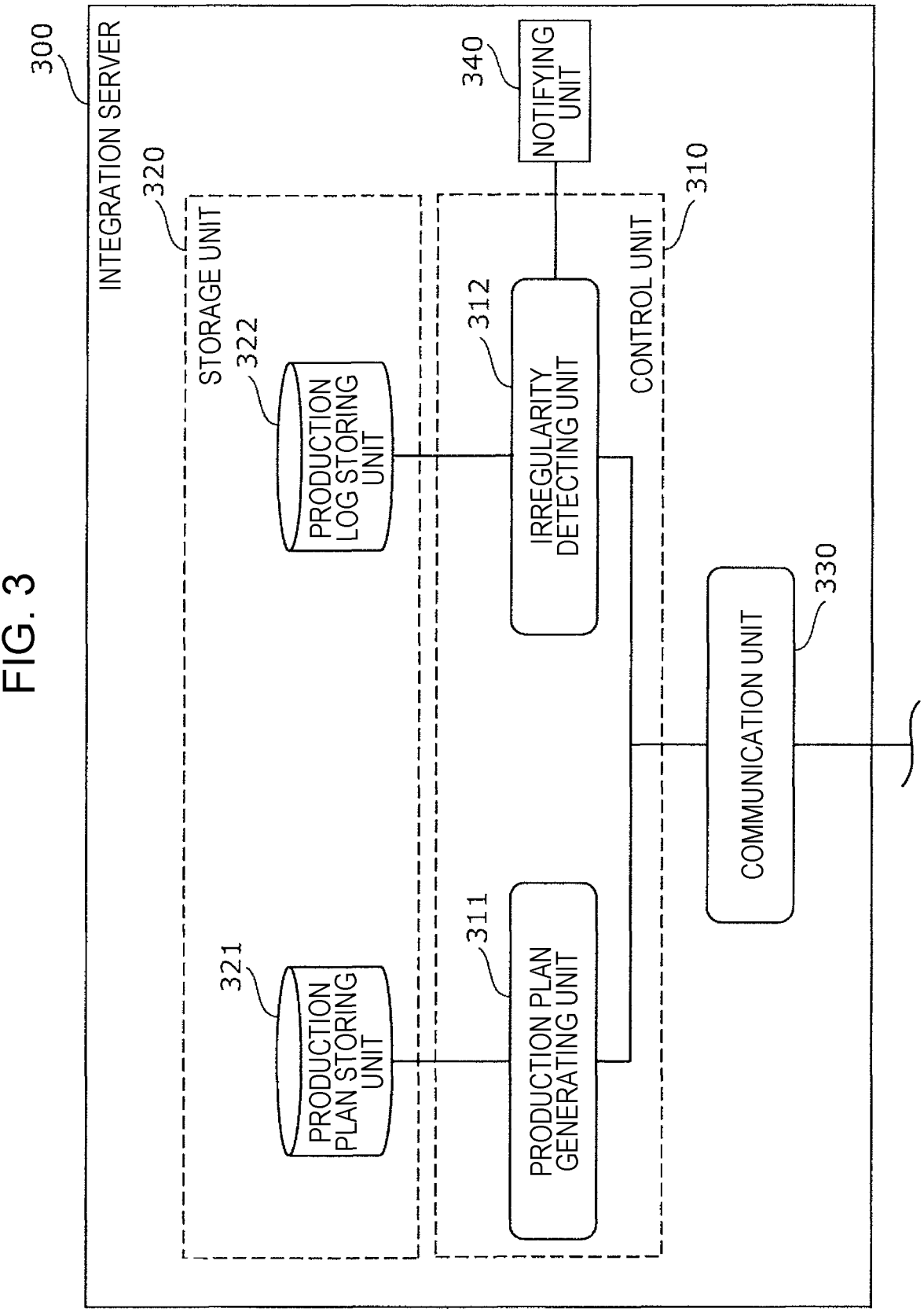
FIG. 3 is a block diagram illustrating a functional configuration of an integration server according to the first embodiment.

FIG. 3 is a block diagram illustrating a functional configuration of the integration server 300 according to the present embodiment.

As illustrated in FIG. 3, the integration server 300 includes a control unit 310, a storage unit (memory) 320, a communication unit 330, and a notifying unit 340.

The control unit 310 includes a production plan generating unit 311 and an irregularity detecting unit 312. The integration server 300 is implemented, for example, by a general-purpose processor and a memory. In this case, upon a software program that is stored in the memory having been executed by the processor, the processor functions as the control unit 310 (specifically, as the production plan generating unit 311 and the irregularity detecting unit 312). Alternatively, the integration server 300 may be implemented in the form of one or more dedicated electronic circuits corresponding to the production plan generating unit 311 and the irregularity detecting unit 312.

The production plan generating unit 311 creates a production plan in each stage (i.e., in each manufacturing system). The production plan generating unit 311 may create the production plan in accordance with an instruction acquired from a user via an acquiring unit (not illustrated) provided in the integration server 300, for example.

Now, an example of the production plan created by the production plan generating unit 311 will be described with reference to FIG. 4A.

FIG. 4A illustrates an example of the production plan according to the present embodiment.

As illustrated in FIG. 4A, the production plan includes a product item number (e.g., information for identifying each processing object), information for identifying each manufacturing apparatus, a planned production count, and a planned production time. FIG. 4A illustrates an example in which a production plan is created according to each product item number, but this is not a limiting example. For example, a production plan may be created according to each manufacturing apparatus. In addition, a production plan may also include information on the processes carried out by the manufacturing apparatuses 120 and 220. For example, in a case in which the manufacturing apparatuses 120 and 220 each carry out a process of mounting a component onto a processing object, the production plan may include information on the component to be mounted and information on the manufacturing such as the temperature to be held when the component is mounted onto the processing object.

In the example illustrated in FIG. 4A, the product item number is "AAAA," the manufacturing apparatuses to be used are "the manufacturing apparatuses 120 and 220," the planned production count of the manufacturing apparatus 120 is "1000," the planned production time of the manufacturing apparatus 120 is "10:00 to 12:00," the planned production count of the manufacturing apparatus 220 is "995," and the planned production time of the manufacturing apparatus 220 is "11:30 to 12:30." The planned production count is, for example, the number of the processing objects that are to be delivered into the corresponding manufacturing apparatus.

The planned production counts of the manufacturing apparatuses 120 and 220 may be set to the same value or different values. The planned production count of the manufacturing apparatus 220 may be set on the basis of the past production log on the product item number "AAAA" in the manufacturing apparatus 120. For example, the planned production count of the manufacturing apparatus 220 may be set in consideration of the proportion defective estimated on the basis of the past production log for the manufacturing apparatus 120. In the example illustrated in FIG. 4A, the planned production count of the manufacturing apparatus 220 is set to 995, which is five less than the planned production count of the manufacturing apparatus 120.

The production plan generating unit 311 stores the generated production plan into a production plan storing unit 321 and also outputs the generated production plan to the production management servers 110 and 210 via the communication unit 330.

Referring again to FIG. 3, the irregularity detecting unit 312 acquires a production log from each of the production management servers 110 and 210 and stores the acquired production logs into a production log storing unit 322. Then, the irregularity detecting unit 312 determines whether there is any irregularity (e.g., whether there is any inconsistency) between the two production logs on the basis of the acquired two production logs. This determination of the irregularity detecting unit 312 will be described later. What is characteristic of the present embodiment is that the integration server 300 includes the irregularity detecting unit 312.

Now, production logs acquired by the irregularity detecting unit 312 from the production management servers 110 and 210 will be described with reference to FIG. 4B.

FIG. 4B illustrates an example of the production logs according to the present embodiment. Specifically, FIG. 4B(a) illustrates an example of the first production log acquired from the production management server 110, and FIG. 4B(b) illustrates an example of the second production log acquired from the production management server 210.

As illustrated in FIG. 4B(a) and FIG. 4B(b), the production logs each include the product item number, the manufacturing apparatus, the delivery count, the good product count, the defective product count, and the production time. The delivery count corresponds to the number of the processing objects detected by a sensor (e.g., the sensors 121 and 221). The good product count and the defective product count correspond to the number of the good products and the number of the defective products, respectively, counted as the determination unit determines the quality of each processing object on which the predetermined process has been carried out by the manufacturing apparatus.

In a case in which no sensor (e.g., the sensor 121 or 221) is provided to detect the delivery count within the manufacturing system, the delivery count need not be included in the production log. In addition, in a case in which no determination unit that determines the quality of a processing object that has been processed by the manufacturing apparatus is provided within the manufacturing system, the production count (i.e., the number of the processing objects that have actually been processed), in place of the good product count and the defective product count, may be included in the production log.

Referring again to FIG. 3, the storage unit 320 includes the production plan storing unit 321 that stores a production plan and the production log storing unit 322 that stores a production log. The storage unit 320 may also store information aside from the production plan and the production log. For example, the storage unit 320 may store the aforementioned software program.

The communication unit 330 is a communication circuit for communicating with the production management servers 110 and 210. For example, the production plan generating unit 311 outputs a production plan to each of the production management servers 110 and 210 via the communication unit 330. In addition, for example, the irregularity detecting unit 312 acquires a production log from each of the production management servers 110 and 210 via the communication unit 330.

The notifying unit 340 provides a notification as to the detection result of the irregularity detecting unit 312. In a case in which at least the irregularity detecting unit 312 has detected irregularity, the notifying unit 340 provides a notification indicating the irregularity. The notifying unit 340 may be, for example, a display device, such as a liquid-crystal display, that displays the detection result, a speaker that emits a sound (e.g., warning sound), or a light-emitting device that emits light (e.g., red warning light or the like).

2. Operation of Irregularity Detecting System

Next, an operation of the irregularity detecting system 10 according to the present embodiment will be described with reference to FIG. 5 to FIG. 9.

Figure 5:
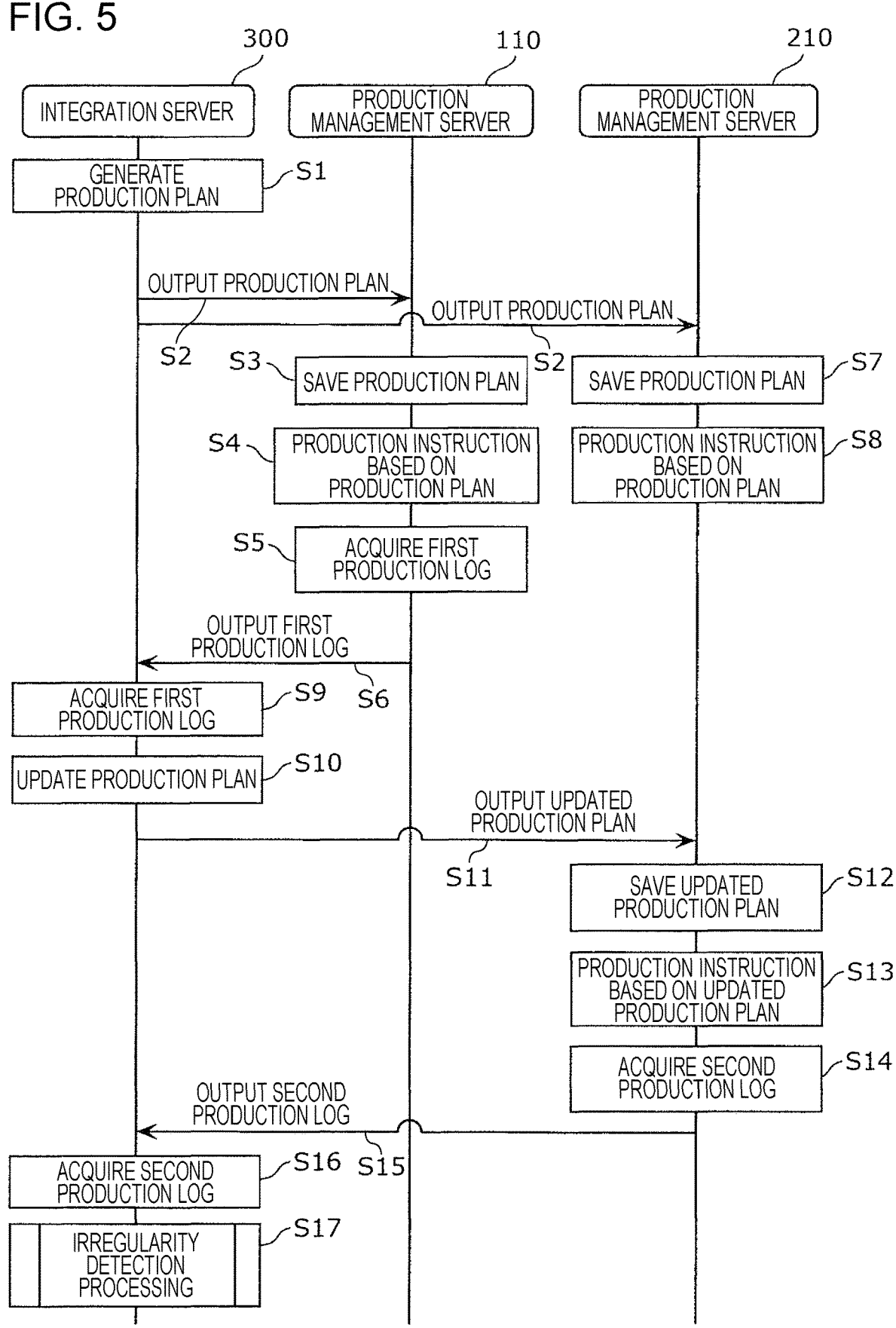
FIG. 5 is a sequence diagram illustrating processing of the irregularity detecting system according to the first embodiment.

FIG. 5 is a sequence diagram illustrating processing of the irregularity detecting system 10 according to the present embodiment. FIG. 5 illustrates the processing of each of the integration server 300 and the production management servers 110 and 210.

As illustrated in FIG. 5, first, a production plan is generated in the integration server 300 (S1). Specifically, the production plan illustrated in FIG. 4A, for example, is created by the production plan generating unit 311. The production plan generating unit 311 stores the created production plan into the production plan storing unit 321. Then, the production plan generating unit 311 outputs the production plan (S2). Specifically, the production plan storing unit 321 outputs the created production plan to the production management servers 110 and 210 via the communication unit 330. In other words, the production plan generating unit 311 issues a production plan instruction to the production management servers 110 and 210.

The production management server 110 saves the acquired production plan (S3). Specifically, the production instructing unit 112 acquires the production plan via the communication unit 117 and stores the acquired production plan into the production plan storing unit 115. Then, the production instructing unit 112 outputs a production instruction that is based on the production plan to the manufacturing apparatus 120 via the communication unit 117 (S4).

Upon acquiring the production instruction, the manufacturing apparatus 120 carries out a predetermined process on a processing object in accordance with the acquired production instruction. Then, the production management server 110 acquires a production log from the manufacturing apparatus 120 (S5). Specifically, the production monitoring unit 113 acquires the first production log illustrated in FIG. 4B(a), for example, from the manufacturing apparatus 120 via the communication unit 117.

The production monitoring unit 113 outputs the first production log to the integration server 300 via the communication unit 117 (S6). The production monitoring unit 113 may also store the first production log into the production log storing unit 116.

The production management server 210 saves the acquired production plan (S7). Specifically, the production instructing unit of the production management server 210 acquires the production plan via the communication unit of the production management server 210 and stores the acquired production plan into the production plan storing unit. Then, the production instructing unit of the production management server 210 outputs a production instruction that is based on the production plan to the manufacturing apparatus 220 via the communication unit of the production management server 210 (S8). Upon acquiring the production instruction, the manufacturing apparatus 220 carries out a predetermined process on a processing object in accordance with the acquired production instruction.

As described above, in the irregularity detecting system 10 according to the present embodiment, the production plan is shared by the manufacturing systems 100 and 200.

The integration server 300 acquires the first production log from the production management server 110 (S9). Specifically, the irregularity detecting unit 312 acquires the first production log from the production management server 110 via the communication unit 330. The irregularity detecting unit 312 may store the acquired first production log into the production log storing unit 322.

The production plan generating unit 311 updates the production plan generated in step S1 in accordance with the first production log that includes the number of the processing objects produced by the manufacturing apparatus 120 (S10). In a case in which the good product count included in the first production log is, for example, 990 as illustrated in FIG. 4B(a), 990 processing objects are to be delivered into the manufacturing system 200. Thus, the planned production count of the manufacturing apparatus 220 in the production plan illustrated in FIG. 4A is updated from 995 to 990. Then, the production plan generating unit 311 outputs the updated production plan at least to the production management server 210 via the communication unit 330 (S11). The production plan generating unit 311 may also output the updated production plan to the production management server 110.

The production management server 210 acquires the updated production plan and saves the updated production plan (S12). Specifically, the production instructing unit of the production management server 210 acquires the updated production plan via the communication unit of the production management server 210 and updates the production plan stored in the production plan storing unit of the production management server 210 in accordance with the acquired production plan. For example, the production instructing unit of the production management server 210 may replace the production plan stored in the production plan storing unit of the production management server 210 with the updated production plan. Then, the production instructing unit of the production management server 210 outputs a production instruction that is based on the updated production plan to the manufacturing apparatus 220 via the communication unit of the production management server 210 (S13). Upon acquiring the updated production instruction, the manufacturing apparatus 220 carries out a predetermined process on a processing object in accordance with the acquired production instruction. Then, the production management server 210 acquires a second production log from the manufacturing apparatus 220 (S14). Specifically, the production monitoring unit of the production management server 210 acquires the production log illustrated in FIG. 4B(b), for example, from the manufacturing apparatus 220 via the communication unit of the production management server 210.

The production monitoring unit outputs the second production log to the integration server 300 via the communication unit (S15). The production monitoring unit may also store the second production log acquired from the manufacturing apparatus 220 into the production log storing unit.

The integration server 300 acquires the second production log from the production management server 210 (S16). Specifically, the irregularity detecting unit 312 acquires the second production log from the production management server 210 via the communication unit 330. The irregularity detecting unit 312 may store the acquired second production log into the production log storing unit 322.

The irregularity detecting unit 312 carries out the irregularity detection processing on the basis of the acquired first and second production logs (S17). The irregularity detection processing carried out by the irregularity detecting unit 312 will be described later in detail.

Acquiring the first production log (S9) and acquiring the second production log (S16) are an example of acquiring a first production log and a second production log.

Next, an operation of the manufacturing system 100 will be described with reference to FIG. 6.

Figure 6:
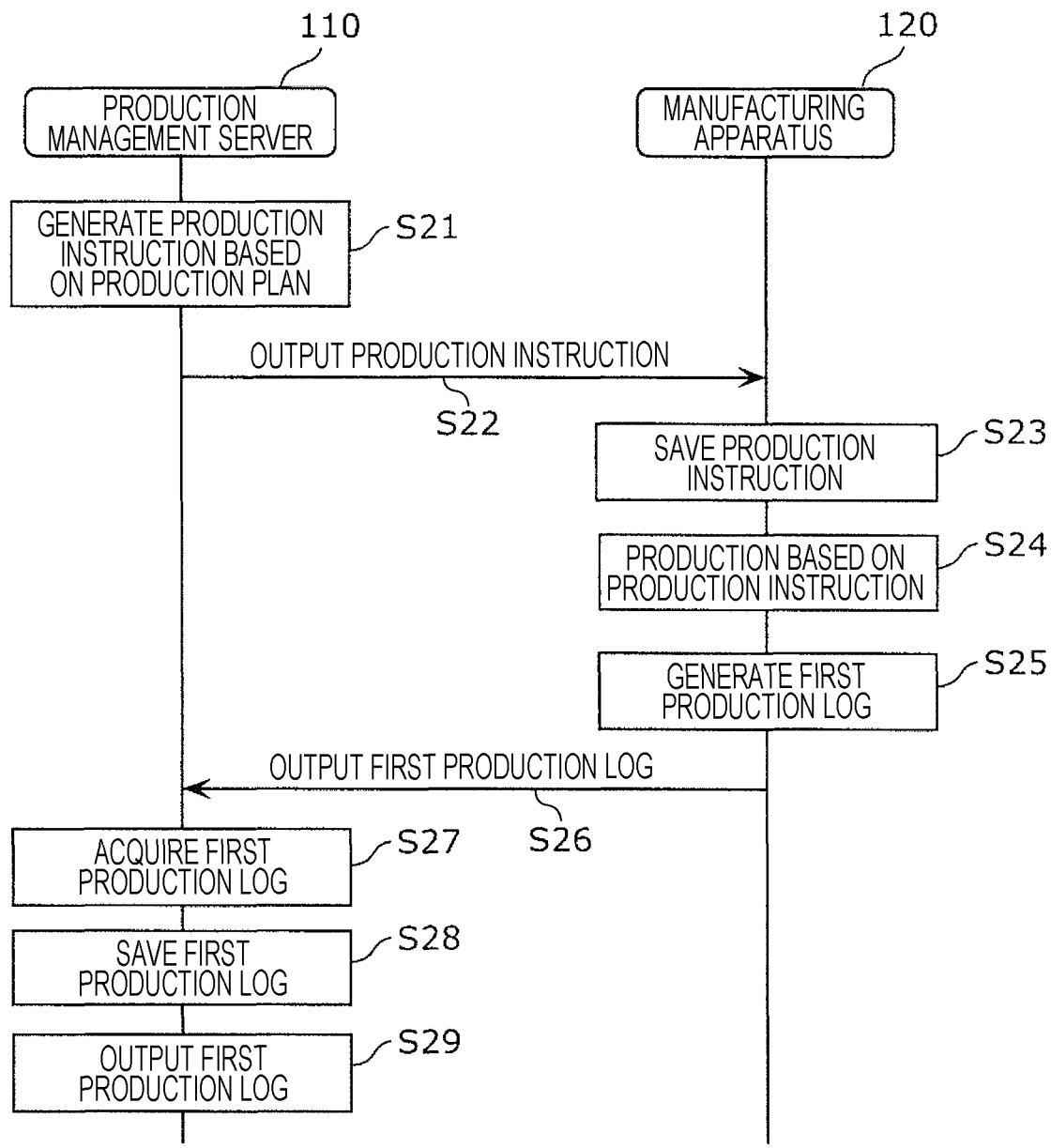
FIG. 6 is a sequence diagram illustrating processing of a manufacturing system according to the first embodiment.

FIG. 6 is a sequence diagram illustrating processing of the manufacturing system 100 according to the present embodiment.

Upon acquiring a production plan from the integration server 300, the production management server 110 generates a production instruction that is based on the acquired production plan (S21) and outputs the generated production instruction to the manufacturing apparatus 120 via the communication unit 117 (S22). The production instruction includes, for example, the planned production count and the planned production time. Steps S21 and S22 correspond to step S4 illustrated in FIG. 5.

Upon acquiring the production instruction, the manufacturing apparatus 120 saves the production instruction into a storage unit (not illustrated) provided in the manufacturing apparatus 120 (S23). Then, the manufacturing apparatus 120 carries out production in accordance with the production instruction (S24). The manufacturing apparatus 120 carries out a predetermined process on a processing object. Then, the manufacturing apparatus 120 generates a first production log (S25) and outputs the generated first production log to the production management server 110 (S26).

The production management server 110 acquires the first production log from the manufacturing apparatus 120 (S27) and saves the acquired first production log (S28). Then, the production management server 110 outputs the first production log to the integration server 300 (S29). Step S29 corresponds to step S15 illustrated in FIG. 5.

The operation of the manufacturing system 200 is similar to the operation of the manufacturing system 100, and descriptions thereof will be omitted. In the manufacturing system 200, a production instruction updated in accordance with the updated production plan is issued to the manufacturing apparatus 220.

Next, processing carried out by the irregularity detecting unit 312 will be described with reference to FIG. 7 and FIG. 8.

Figure 7:
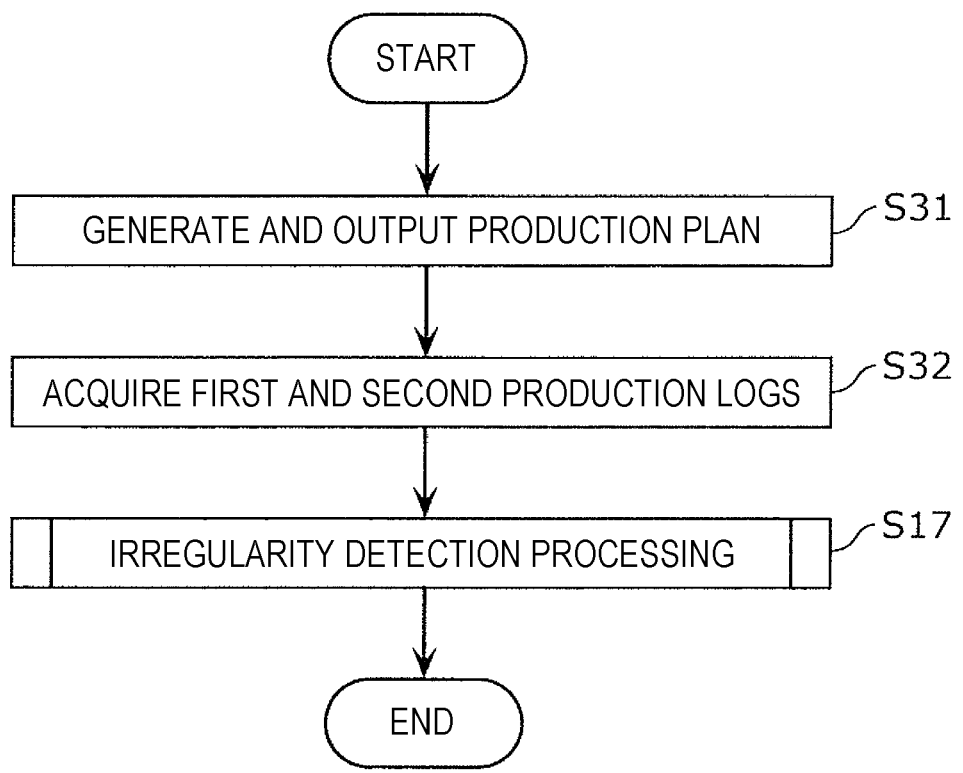
FIG. 7 is a flowchart illustrating processing carried out by the integration server according to the first embodiment.

FIG. 7 is a flowchart illustrating processing carried out by the integration server 300 according to the present embodiment.

As illustrated in FIG. 7, after generating a production plan, the production plan generating unit 311 stores the generated production plan into the production plan storing unit 321 and also outputs the generated production plan to the production management servers 110 and 210 (S31). Step S31 corresponds to steps S1 and S2 illustrated in FIG. 5. Then, after the production is carried out in each of the manufacturing systems 100 and 200, the irregularity detecting unit 312 acquires a first production log from the production management server 110 and a second production log from the production management server 210 (S32). Step S32 corresponds to steps S9 and S16 illustrated in FIG. 5.

As described above, the integration server 300 stores the production plan and the first and second production logs. Specifically, the production plan storing unit 321 stores the production plan, and the production log storing unit 322 stores the first and second production logs. Then, the irregularity detecting unit 312 carries out the irregularity detection processing that includes making a determination as to whether any irregularity is present in the first and second production logs on the basis of the production plan and the first and second production logs (S17).

Now, the irregularity detection processing carried out by the irregularity detecting unit 312 will be described with reference to FIG. 8.

Figure 8:
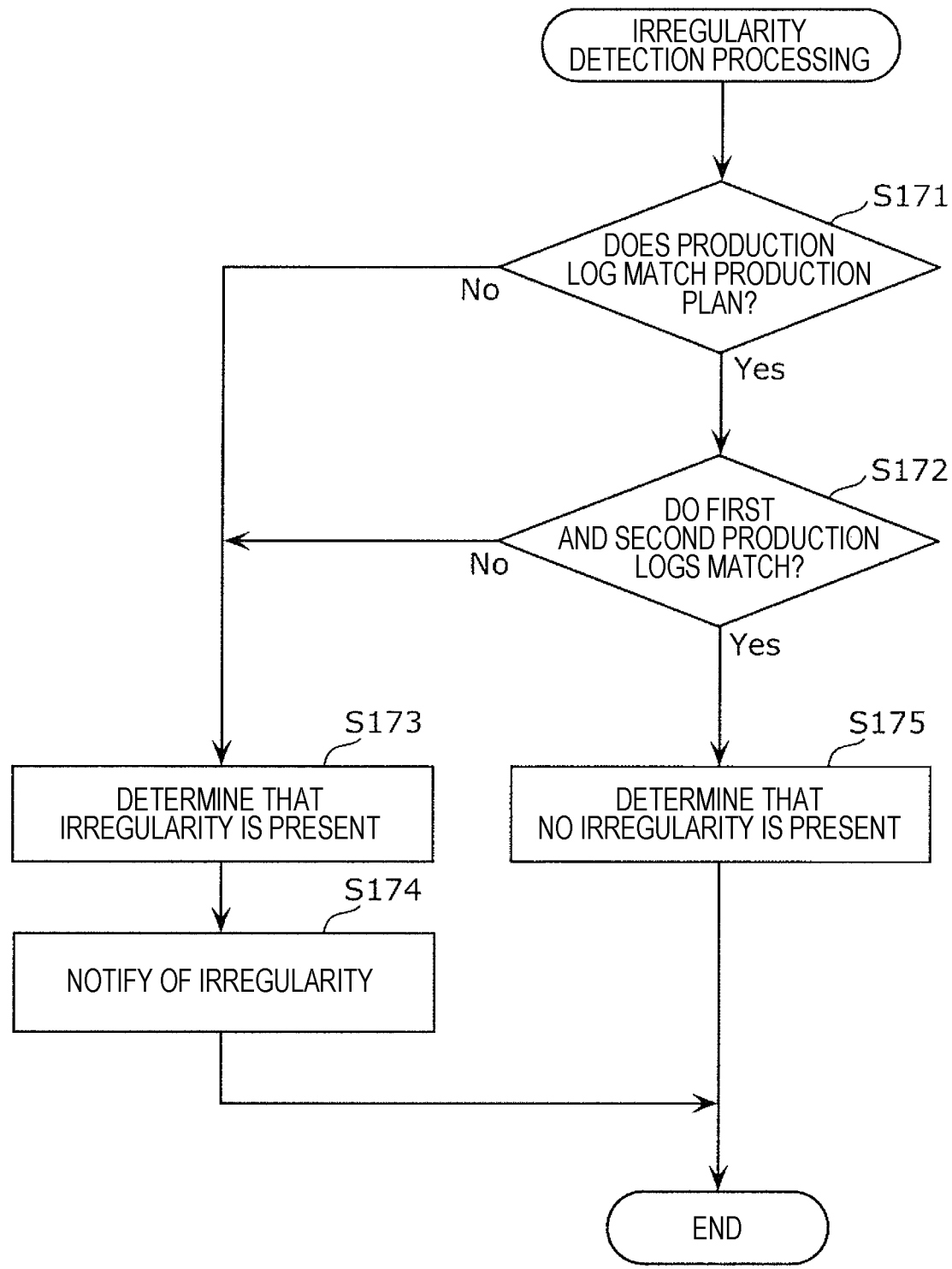
FIG. 8 is a flowchart illustrating irregularity detection processing carried out by an irregularity detecting unit according to the first embodiment.

FIG. 8 is a flowchart illustrating the irregularity detection processing carried out by the irregularity detecting unit 312 according to the present embodiment. Specifically, the flowchart illustrates the processing carried out by the irregularity detecting unit 312 included in the integration server 300. What is characteristic of the present embodiment is that the irregularity detecting unit 312 carries out the processing in step S172.

First, the irregularity detecting unit 312 determines whether the production log matches the production plan (S171). For example, the irregularity detecting unit 312 determines whether the delivery counts indicated in FIG. 4B(a) and FIG. 4B(b) match the planned production count indicated in FIG. 4A. In a case in which the delivery count of 1000 matches the planned production count of 1000 in the production plan in the manufacturing apparatus 120 as illustrated in FIG. 4A and FIG. 4B(a) (Yes in S171), the processing proceeds to step S172. Meanwhile, in a case in which the delivery count does not match the planned production count in the manufacturing apparatus 120 (No in S171), the irregularity detecting unit 312 determines that irregularity is present in the first production log and the second production log (S173). In step S173, of the first production log and the second production log, the production log having the delivery count that does not match the planned production count is determined to have irregularity.

In the example described above, the processing proceeds to step S172 when the production log matches the production plan in step S171, but this is not a limiting example. For example, if the difference between the production plan and the production log is no greater than a predetermined value, the processing may proceed to step S172. The predetermined value may be set, for example, on the basis of an actual record or the like of the proportion defective between a manufacturing system upstream from the manufacturing system 100 and the manufacturing system 100.

Step S171 is carried out on each of the first and second production logs. In other words, the processing proceeds to step S173 in a case in which at least one of the first and second production logs fails to match the production plan.

In a case in which the determination of Yes is made in step S171, it is determined whether the first and second production logs match (S172). In step S172, for example, it is determined whether the delivery count of the processing objects delivered into the second stage matches the first production count. In other words, in step S172, any irregularity in the first production log and the second production log is determined on the basis of the first production count and the delivery count in the second stage.

In a case in which the delivery count in the second stage fails to match the good product count in the first stage (No in S172), there is a possibility that at least one of the first and second production logs has been altered. Thus, the irregularity detecting unit 312 determines that irregularity is present in the first and second production logs (S173). The determination in step S172 is made with the good product count out of the processing objects that have been processed in the first stage regarded as the first production count and with the delivery count of the processing objects delivered into the second stage regarded as the number of the processing objects in the second stage. When it is determined in step S172 that the delivery count in the second stage fails to match the good product count in the first stage, the irregularity detecting unit 312 determines that irregularity is present between the first and second production logs.

Then, the irregularity detecting unit 312 causes the notifying unit 340 to provide a notification indicating the present of irregularity (S174). In other words, in a case in which the detection result of the irregularity detecting unit 312 indicates the presence of irregularity, the notifying unit 340 provides a notification indicating the irregularity. This configuration makes it possible to notify a manufacturing operator of irregularity in at least one of the first and second production logs. In other words, the manufacturing operator can be notified of any computer virus infection or the like of at least one of the production management servers 110 and 210 and of any alteration of the production logs.

In the example described above, the determination in step S172 is made with the good product count out of the processing objects that have been processed in the first stage regarded as the first production count and with the delivery count of the processing objects delivered into the second stage regarded as the number of the processing objects in the second stage. In a case in which the manufacturing system 100 includes no determination unit, the first production count may be served by the number of the processing objects that have been processed in the manufacturing apparatus 120. In other words, the first production count may be the value including the good products and the defective products.

In a case in which the delivery count in the second stage matches the good product count in the first stage (Yes in S172), the processing proceeds to step S175, and the irregularity detecting unit 312 determines that no irregularity is present in the first and second production logs (S175). When it is determined in step S172 that the delivery count in the second stage matches the good product count in the first stage, the irregularity detecting unit 312 determines that no irregularity is present in the first and second production logs.

The irregularity detecting unit 312 may vary the manner of providing a notification in a case in which the determination of irregularity is made in step S172 from that in a case in which the determination of irregularity is made in step S171. In addition, even in a case in which the irregularity detecting unit 312 has determined that no irregularity is present, the irregularity detecting unit 312 may cause the notifying unit 340 to provide a notification indicating the absence of any irregularity. It suffices that the irregularity detecting unit 312 can notify a manufacturing operator or the like of any irregularity in the first and second production logs at least in a case in which the detection result (determination result) indicates the presence of any irregularity.

In the example described above, the first and second production logs match in step S172, but this is not a limiting example. For example, in a case in which the difference between the first and second production logs is greater than a predetermined value, the irregularity detecting unit 312 may determine that irregularity is present in the first and second production logs. This configuration is employed, for example, in a case in which the manufacturing apparatus 220 does not include the sensor 221 or in a case in which an inspection stage through sampling is provided between the manufacturing systems 100 and 200. The irregularity detection processing carried out by the irregularity detecting unit 312 in such a case will be described with reference to FIG. 9.

Figure 9:
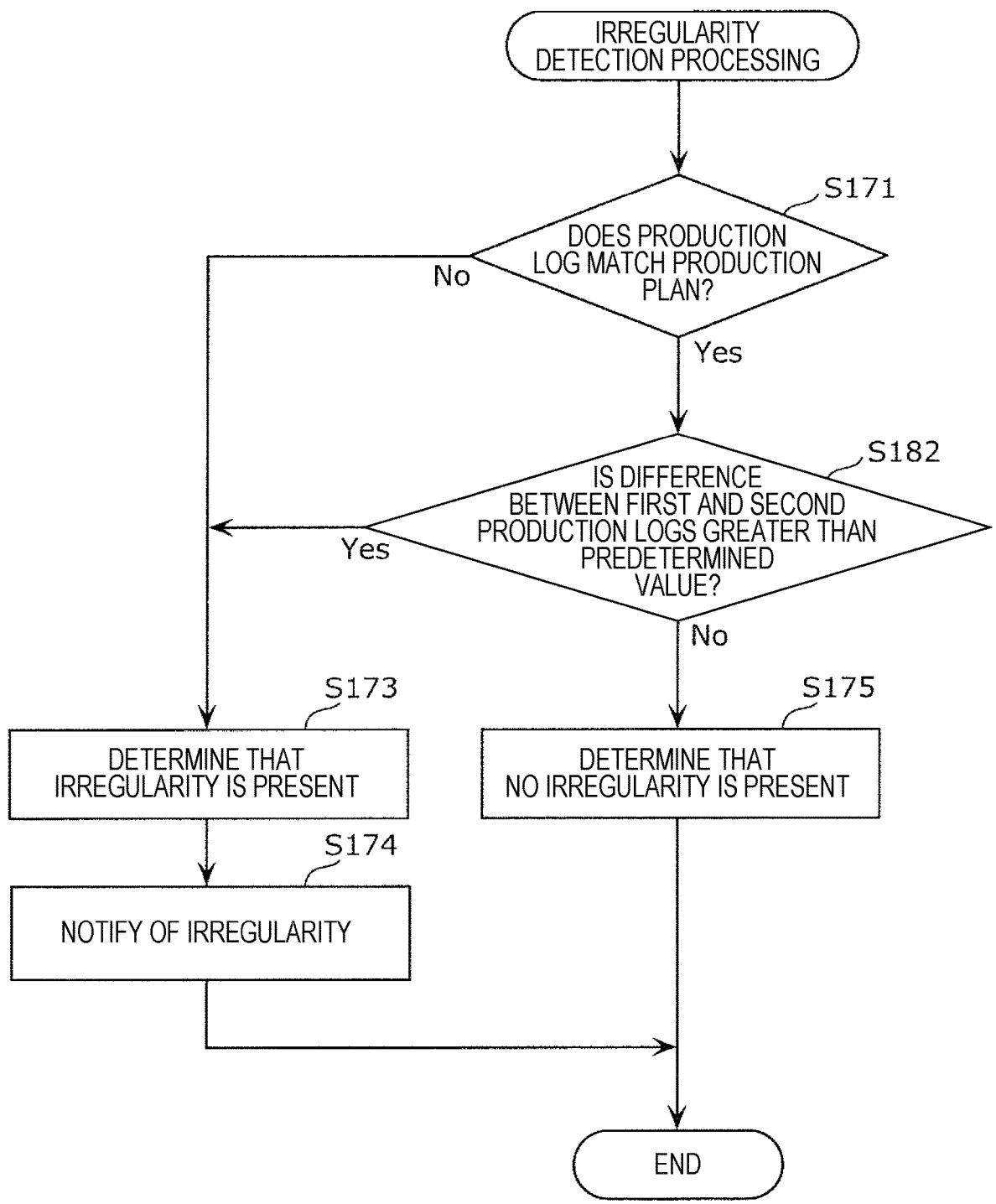
FIG. 9 is a flowchart illustrating another example of the irregularity detection processing carried out by the irregularity detecting unit according to the first embodiment.

FIG. 9 is a flowchart illustrating another example of the irregularity detection processing carried out by the irregularity detecting unit 312 according to the present embodiment. The flowchart illustrated in FIG. 9 differs from the flowchart illustrated in FIG. 8 in the presence of step S182, and this step S182 will be mainly described.

As illustrated in FIG. 9, in a case in which the production log matches the production plan (Yes in step S171), it is determined whether the difference between the first and second production logs is greater than a predetermined value (S182). For example, in a case in which the manufacturing apparatus 220 does not include the sensor 221, information that indicates the number of the processing objects in the second production log includes the good product count and the defective product count. For example, in a case in which the difference between the good product count in the first production log and the good product count in the second production log is greater than a predetermined value (Yes in S182), the irregularity detecting unit 312 may determine that irregularity is present in the first production log and the second production log (S173). The predetermined value may be determined as desired or may be determined on the basis of the actual record of the proportion defective in the manufacturing system 200. The predetermined value may be a value that is no smaller than the product of the mean value of the proportion defective in the manufacturing system 200 and the good product count in the first production log, for example. The good product count in the second production log is an example of a second production count. The second production count, however, is not limited to the good product count and may be the sum of the good product count and the defective product count or the number of the processing objects that have been processed in the manufacturing apparatus 220.

In a case in which a sample inspection stage is included between the manufacturing systems 100 and 200, the delivery count of the processing objects delivered into the manufacturing system 200 is smaller than the good product count in the first production log. Specifically, the number obtained by subtracting the inspection count (the number of samples) in the inspection stage from the good product count in the first production log serves as the delivery count in the manufacturing system 200. Therefore, the predetermined value in step S182 may be a value that is no smaller than the inspection count in the inspection stage, for example.

The inspection count in the inspection stage may be stored in advance in the storage unit 320. For example, the delivery count or the planned production count may be stored while being associated with the inspection count. In addition, in a case in which the inspection stage is provided, information on the inspection stage is included in the production plan. The production plan may include, for example, information on the inspection count. The irregularity detecting unit 312 may acquire the production plan stored in the production plan storing unit 321 and set, as the predetermined value, a value that is no smaller than the inspection count included in the acquired production plan.

3. Effects and Others

As described thus far, the integration server 300 according to the present embodiment manages production in the manufacturing line 400. The integration server 300 includes the communication unit 330 that acquires the first production log and the second production log. The first production log includes the first production count of the processing objects in the first stage included in the manufacturing line 400. The second production log includes the number of the processing objects in the second stage included in the manufacturing line 400 and carried out after the first stage. The integration server 300 also includes the irregularity detecting unit 312 that detects the presence of irregularity in the first production log and the second production log on the basis of the first production count and the number of the processing objects in the second stage.

With this configuration, the irregularity detecting unit 312 can detect the presence of irregularity in the first production log and the second production log on the basis of the first production count and the number of the processing objects in the second stage acquired while the manufacturing line 400 is in operation. Accordingly, the integration server 300 according to the present embodiment can detect the presence of irregularity in the first production log and the second production log without stopping the operation of the manufacturing line 400.

In addition, the irregularity detecting unit 312 detects irregularity in the first production log and the second production log in a case in which the difference between the first production count and the number of the processing objects in the second stage is greater than a predetermined value.

With this configuration, the irregularity detecting unit 312 can detect the presence of irregularity in the production logs on the basis of the difference between the first production count and the number of the processing objects in the second stage. In addition, the processing load in the irregularity detecting unit 312 can be reduced as compared to a case in which the presence of irregularity is determined on the basis of the production log in each of the first stage and the second stage, and thus any irregularity can be detected more easily.

In addition, the irregularity detecting unit 312 detects the presence of irregularity in the first production log and the second production log with the delivery count of the processing objects delivered into the second stage regarded as the number of the processing objects in the second stage.

With this configuration, the irregularity detecting unit 312 can detect the presence of irregularity in the first production log and the second production log on the basis of the first production count and the delivery count of the processing objects delivered into the second stage. In a case in which no other stage is provided between the first stage and the second stage, the first production count may be equal to the delivery count of the processing objects delivered into the second stage. Accordingly, the predetermined value can be kept small, and the irregularity detecting unit 312 can thus detect the presence of irregularity in the production logs with higher accuracy.

In addition, the irregularity detecting unit 312 detects the presence of irregularity in the first production log and the second production log with the second production count of the processing objects in the second stage regarded as the number of the processing objects in the second stage.

With this configuration, the irregularity detecting unit 312 can detect the presence of irregularity in the first production log and the second production log on the basis of the first production count and the second production count even in a case in which the delivery count in the second stage cannot be detected (e.g., in a case in which the sensor 221 is not provided). Accordingly, the irregularity detecting unit 312 can detect the presence of the above-described irregularity even in a simplified apparatus in which the manufacturing apparatus 220 and so on constituting the second stage do not include the sensor 221 or the like. In other words, the usability of the integration server 300 improves.

In addition, the irregularity detecting unit 312 detects the irregularity in the first production log and the second production log in a case in which the first production count and the delivery count of the processing objects delivered into the second stage fail to match.

With this configuration, the irregularity detecting unit 312 can detect the presence of irregularity in the production logs with even higher accuracy.

In addition, the manufacturing line 400 includes the sample inspection stage provided between the first stage and the second stage, and the predetermined value is greater than the inspection count in the inspection stage.

With this configuration, the irregularity detecting unit 312 can detect the presence of irregularity in the production logs in consideration of the inspection count in the inspection stage even in a case in which the sample inspection stage is provided in the manufacturing line 400. In other words, the usability of the integration server 300 improves.

In addition, the irregularity detecting unit 312 detects the presence of irregularity in the first production log and the second production log with the number of the good products among the processing objects that have been processed in the first stage regarded as the first production count.

With this configuration, the irregularity detecting unit 312 can detect the presence of irregularity in the production logs even in a case in which the quality of each processing object that has been processed in the first stage is determined and only the good products are delivered into the second stage. In other words, the usability of the integration server 300 improves.

In addition, the integration server 300 further includes the notifying unit 340 that provides a notification of the detection result of the irregularity detecting unit 312. The notifying unit 340 provides a notification indicating the presence of irregularity in a case in which the detection result of the irregularity detecting unit 312 indicates the presence of irregularity.

With this configuration, in a case in which the irregularity detecting unit 312 has detected any irregularity, a manufacturing operator or the like can be notified of the irregularity and can take an appropriate measure.

In addition, an information processing method of the integration server 300 according to the present embodiment is an information processing method of the integration server 300 that manages production in the manufacturing line 400. The information processing method includes acquiring the first production log and the second production log. The first production log includes the first production count of the processing objects in the first stage included in the manufacturing line 400. The second production log includes the number of the processing objects in the second stage included in the manufacturing line 400 and carried out after the first stage. The information processing method also includes detecting the presence of irregularity in the first production log and the second production log on the basis of the first production count and the number of the processing objects in the second stage.

In addition, the present disclosure may be implemented in the form of a program that causes a computer to execute the information processing method described above.

Thus, an effect similar to that of the integration server 300 described above is obtained.

Second Embodiment

An irregularity detecting system 10a according to the present embodiment will be described with reference to FIG. 10 and FIG. 11. It is to be noted that the descriptions in the present embodiment center on the differences from the first embodiment, and configurations that are substantially identical to those of the first embodiment are given identical reference characters, and descriptions thereof will be omitted or simplified in some cases.

Figure 10:
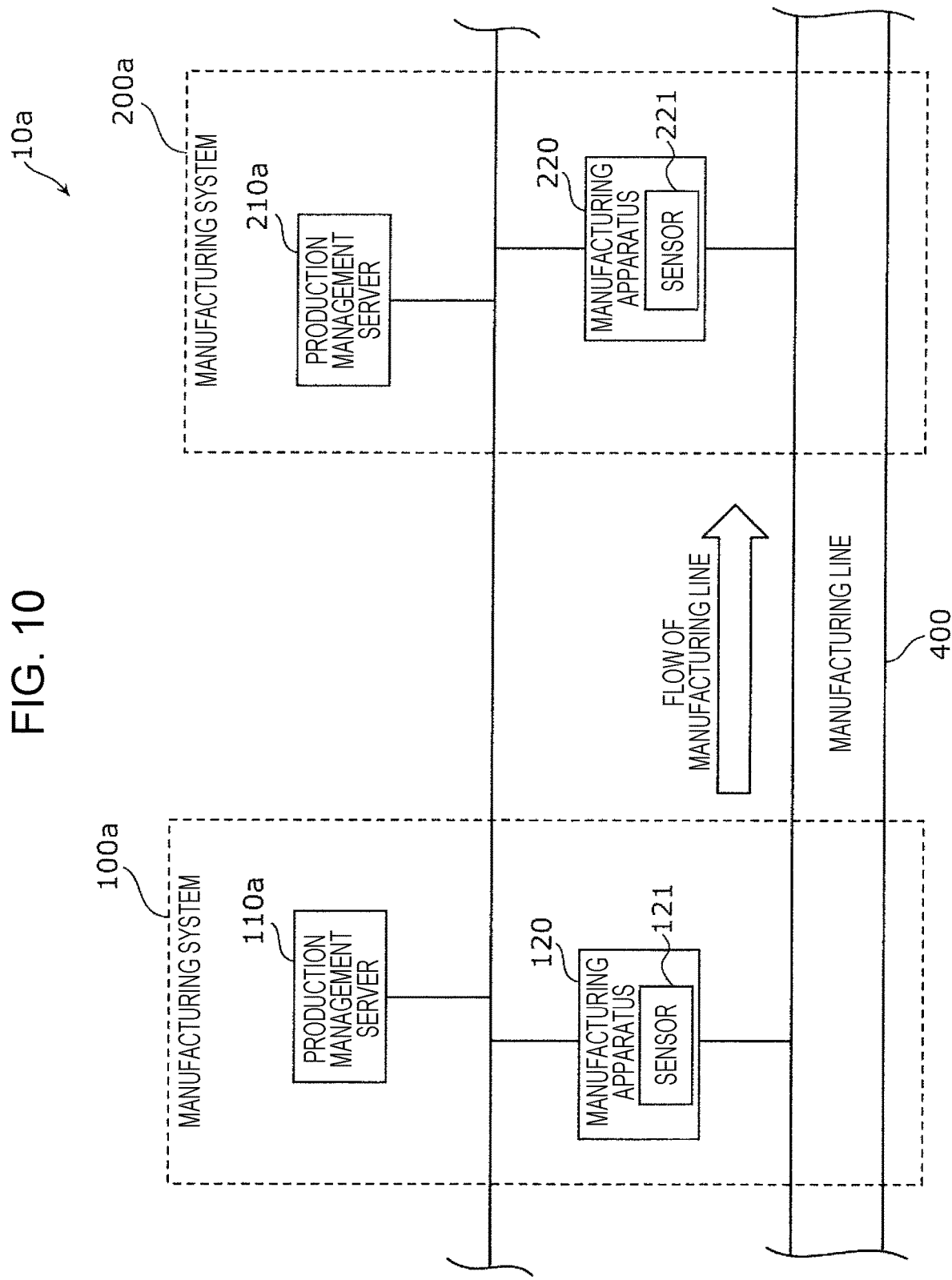
FIG. 10 illustrates a configuration of an irregularity detecting system according to a second embodiment.

FIG. 10 illustrates a configuration of the irregularity detecting system 10a according to the present embodiment. FIG. 11 is a block diagram illustrating a functional configuration of a production management server 110a according to the present embodiment. The functional configuration of a production management server 210a is similar to that of the production management server 110a, and descriptions thereof will be omitted.

As illustrated in FIG. 10, the irregularity detecting system 10a includes a manufacturing system 100a and a manufacturing system 200a. What differs from the first embodiment is that the irregularity detecting system 10a includes no integration server and that the production management servers 110a and 210a are communicably interconnected. Manufacturing apparatuses 120 and 220 and so on are similar to those of the first embodiment.

In the present embodiment, the production management servers 110a and 210a directly communicate with each other. The irregularity detecting system 10a includes a plurality of production management servers including the production management servers 110a and 210a, and these production management servers are communicably interconnected. In other words, the irregularity detecting system 10a according to the present embodiment uses a P2P (peer-to-peer) network. Hereinafter, only the production management servers 110a and 210a will be described.

Figure 11:
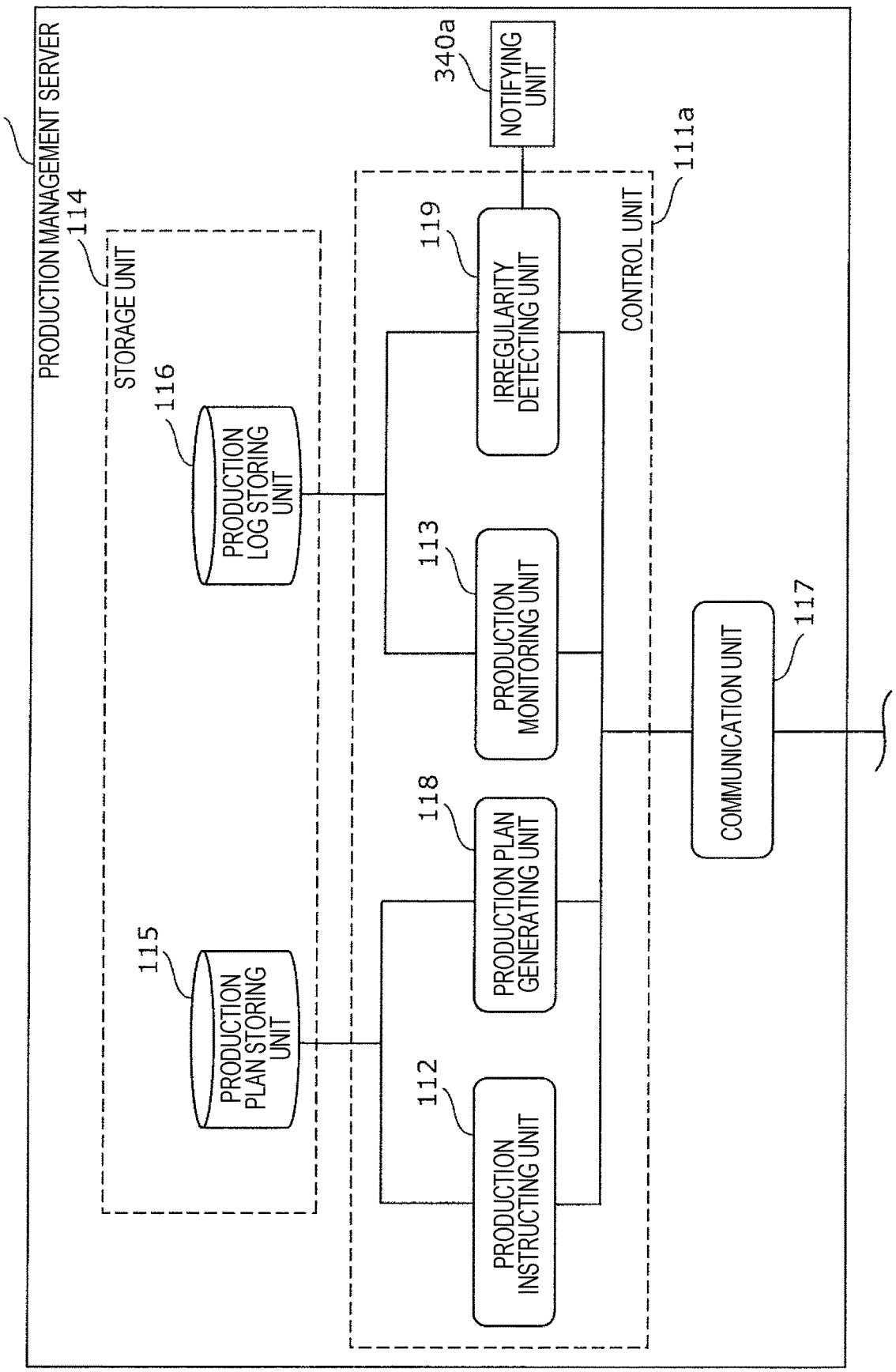
FIG. 11 is a block diagram illustrating a functional configuration of a production management server according to the second embodiment.

As illustrated in FIG. 11, the production management server 110a according to the present embodiment includes a control unit 111a, a storage unit 114, a communication unit 117, and a notifying unit 340a. What is characteristic of the production management server 110a is the functional configuration of the control unit 111a.

The control unit 111a includes a production instructing unit 112, a production monitoring unit 113, a production plan generating unit 118, and an irregularity detecting unit 119. In other words, in addition to the configuration in the production management server 110 according to the first embodiment, the control unit 111a includes the production plan generating unit 118 and the irregularity detecting unit 119.

The production plan generating unit 118 corresponds to the production plan generating unit 311 included in the integration server 300 according to the first embodiment. In other words, a production plan is generated in the production management server 110a. Then, the production plan is stored in a production plan storing unit 115. In addition, the production plan generating unit 118 outputs the production plan to the production management server 210a via the communication unit 117. For example, the production management server 210a causes the manufacturing apparatus 220 to carry out production in accordance with the production plan acquired from the production management server 110a. It is to be noted that all of the plurality of production management servers included in the irregularity detecting system 10a acquire the production plan generated by the production plan generating unit 118 via the P2P network.

The production management server 110a acquires a first production log from the manufacturing apparatus 120, and the production management server 210a acquires a second production log from the manufacturing apparatus 220. The production monitoring unit 113 acquires the first production log from the manufacturing apparatus 120. A production monitoring unit (not illustrated) of the production management server 210a acquires the second production log from the manufacturing apparatus 220. Then, the production management server 110a outputs the first production log to the production management server 210a, and the production management server 210a outputs the second production log to the production management server 110a. With this configuration, the first and second production logs are stored into each of a production log storing unit 116 and a production log storing unit (not illustrated) included in the production management server 210a. The production management server 110a and the production management server 210a each store the first production log and the second production log in the form of a blockchain transaction. In other words, what is characteristic of the irregularity detecting system 10a according to the present embodiment is that the irregularity detecting system 10a places the production logs under distributed management.

As each of the plurality of production management servers outputs, to the other production management servers, a production log acquired from a manufacturing apparatus as described above, the plurality of production management servers including the production management servers 110a and 210a each hold a record that stores a plurality of transactions (e.g., a plurality of production logs including the first and second production logs). The record stored by each of the plurality of production management servers is constituted as a single block that includes a hash value of the plurality of transactions and is formed by connecting these blocks in a chain form. This chain form is achieved by so forming a subsequent block as to include a hash value of a given block. In other words, a plurality of data sets are managed in the form of a blockchain. The stated record is stored, for example, in the production log storing unit 116.

In addition, a consensus for sharing the record information among all of the production management servers on the network is formed. The consensus is formed through a consensus algorithm (e.g., proof of work). The consensus is formed, for example, at a timing when a block is formed from a transaction in a new production log and registered into the record. The record may further include the production plan and the inspection count in a case in which the inspection stage is provided in the manufacturing line 400. In addition, the production log storing unit provided in each of the plurality of production management servers excluding the production management server 110a also stores the record similar to that in the production log storing unit 116.

As described above, since the plurality of production management servers store the same record (information), even if a failure occurs in some production management servers of the plurality of production management servers due to a virus infection or the like, the irregularity detecting system 10a can be maintained. In addition, a production log is stored in the form of a blockchain transaction and is thus difficult to alter. In other words, the irregularity detecting system 10a with higher reliability can be achieved.

The plurality of production management servers each include an irregularity detecting unit (e.g., the irregularity detecting unit 119 illustrated in FIG. 11). Therefore, the plurality of production management servers may each carry out the irregularity detection processing. The irregularity detection processing of the irregularity detecting unit is similar to that in the first embodiment. In a case in which the production management server has detected any irregularity, the production management server causes the notifying unit 340a to provide a notification indicating the irregularity. The production management servers 110a and 210a are each an example of an information processing apparatus that detects the presence of irregularity in first and second production logs on the basis of the first and second production logs. In addition, the result of the determination of the irregularity may also be included in the record.

Other Embodiments

Thus far, the embodiments have been described to illustrate the techniques of the present disclosure. The appended drawings and the detailed descriptions are provided for that purpose.

Therefore, the constituent elements illustrated in the appended drawings and the detailed descriptions may include not only the constituent elements that are essential for solving the problem but also the constituent elements that are for illustrating the techniques and are not essential for solving the problem. Hence, that these non-essential constituent elements are illustrated in the appended drawings and the detailed descriptions should not immediately give any authorization for interpretation that these non-essential constituent elements are essential.

In addition, in each of the embodiments described above, the communication method between the apparatuses is not particularly limited. The apparatuses may communicate with each other through wired communication or wireless communication.

In addition, in the examples described in the foregoing embodiments, the manufacturing apparatus and the production management server are separate entities, but the manufacturing apparatus and the production management server may be a single integrated apparatus.

In addition, in each of the embodiments described above, the constituent elements may each be constituted by dedicated hardware or may each be implemented upon execution of a software program suitable for each constituent element. Each of the constituent elements may be implemented as a program executing unit, such as a processor, reads out a software program recorded in a recording medium, such as a hard disk or a semiconductor memory, and executes the software program. The processor is constituted by one or more electronic circuits including a semiconductor integrated circuit (IC) or a large scale integration (LSI). A plurality of electronic circuits may be integrated into a single chip or provided in a plurality of chips. A plurality of chips may be integrated into a single device or provided in a plurality of devices.

In addition, general or specific embodiments of the present disclosure may be implemented in the form of a system, an apparatus, a method, an integrated circuit, a computer program, or a non-transitory recording medium, such as a computer-readable CD-ROM or an optical disc. The program may be stored in advance in a recording medium or supplied to a recording medium via a broadband communication network including the internet. In addition, general or specific embodiments of the above may be implemented in the form of a desired combination of a system, an apparatus, a method, an integrated circuit, a computer program, and a recording medium.

In addition, the order of the plurality of processing steps in the operation of the information processing apparatus described in each of the foregoing embodiments is an example. The order of the plurality of processing steps may be modified, or the plurality of processing steps may be executed in parallel.

In addition, an embodiment obtained by combining the constituent elements and the functions illustrated in each of the foregoing embodiments as desired is also encompassed by the scope of the present disclosure.

The present disclosure is effective in an integration server that manages production in an in-lined manufacturing line.

What is claimed is:

1. An information processing apparatus that controls production in a manufacturing line including a first stage performed in a first manufacturing system and a second stage performed in a second manufacturing system after the first stage, the first manufacturing system performing a first predetermined process on processing objects in the first stage, and the second manufacturing system performing a second predetermined process on the processing objects in the second stage, the second manufacturing system including a sensor,
the information processing apparatus including a processor; and a memory storing a computer program,
while the first manufacturing system and the second manufacturing system are in operation, the computer program, when executed by the processor, causes the processor to perform operations including:
acquiring, from the first manufacturing system, a first production log including a number of non-defective processing objects in the first stage;
acquiring, from the second manufacturing system, a second production log including a number of processing objects delivered to the second stage detected by the sensor; and
detecting a presence of irregularity in the manufacturing line, in a case where the number of processing objects delivered to the second stage fails to match the number of non-defective processing objects in the first stage.

2. The information processing apparatus according to claim 1,
wherein the manufacturing line includes a sample inspection stage provided between the first stage and the second stage, and
wherein the presence of irregularity in the manufacturing line is detected in a case where the number of processing objects delivered into the second stage fails to match a number obtained by subtracting a number of samples in the sample inspection stage from the number of non-defective processing objects.

3. The information processing apparatus according to claim 1, wherein the program, when executed by the processor, causes the processor to perform further operations including:
providing a notification indicating the presence of irregularity in a case in which a detection result indicates irregularity in the detecting.

4. An information processing method of an information processing apparatus that controls production in a manufacturing line including a first stage performed in a first manufacturing system and a second stage performed in a second manufacturing system after the first stage, the first manufacturing system performing a first predetermined process on processing objects in the first stage, and the second manufacturing system performing a second predetermined process on the processing objects in the second stage, the second manufacturing system including a sensor,
the information processing method, which is performed while the first manufacturing system and the second manufacturing system are in operation, comprising:
acquiring, from the first manufacturing system, a first production log including a number of non-defective processing objects in the first stage;
acquiring, from the second manufacturing system, a second production log including a number of processing objects delivered to the second stage detected by the sensor; and
detecting a presence of irregularity in the manufacturing line, in a case where the number of processing objects delivered to the second stage fails to match the number of non-defective processing objects in the first stage.

5. A non-transitory recording medium storing a program that controls production in a manufacturing line including a first stage performed in a first manufacturing system and a second stage performed in a second manufacturing system after the first stage, the first manufacturing system performing a first predetermined process on processing objects in the first stage, and the second manufacturing system performing a second predetermined process on the processing objects in the second stage, the second manufacturing system including a sensor,
while the first manufacturing system and the second manufacturing system are in operation, the program causing a computer to execute:
acquiring, from the first manufacturing system, a first production log including a number of non-defective processing objects in the first stage;
acquiring, from the second manufacturing system, a second production log including a number of processing objects delivered to the second stage detected by the sensor; and
detecting a presence of irregularity in the manufacturing line, in a case where the number of processing objects delivered to the second stage fails to match the number of non-defective processing objects in the first stage.

* * * * *